INVENTORS
SIGURD PARELI DANIELSEN
EIDAR HERMANN JOHNSEN
WALTER HERBERT ERWIN WIDL
BY Hane and Nydick
ATTORNEYS INVENTORS
SIGURD PARELI DANIELSEN
EIDAR HERMANN JOHNSEN
WALTER HERBERT ERWIN WIDL
BY Hane and Nydick
ATTORNEYS INVENTORS
SIGURD PARELI DANIELSEN
EIDAR HERMANN JOHNSEN
WALTER HERBERT ERWIN WIDL
BY Kane and Nydick
ATTORNEYS

United States Patent Office 3,304,508

Patented Feb. 14, 1967

3,304,508

LEVEL REGENERATING ARRANGEMENT FOR TRANSMISSION OF BIPOLAR SIGNALS

Sigurd Pareli Danielsen, Bandhagen, Eidar Hermann Johnsen, Farsta, and Walter Herbert Erwin Widl, Bandhagen, Sweden, assignors to Telefonaktiebolaget L M Ericsson, Stockholm, Sweden, a corporation of Sweden

Filed Jan. 21, 1965, Ser. No. 427,015
Claims priority, application Sweden, May 14, 1964, 5,888/64
2 Claims. (Cl. 328—164)

The present invention relates to a level regenerating arrangement for receiving bipolar signals so that the regeneration of a signal received after an interruption will be independent of the voltage level to which level the regenerating arrangement is automatically set after a longer interruption.

In data transmission information is represented by positive and negative pulses which implies that the spectrum of the signal has a certain frequency band. In certain systems the width of the frequency band is limited so that the demodulated signal has no direct current component. In order to restore the direct current component a regenerating arrangement for low frequency is used. Such a regenerating arrangement comprises a summation circuit, a limiting amplifier and a low pass filter. The output signal from the output of the limiting amplifier is supplied through the low pass filter back to the summation circuit where it is added to the incoming signal and causes a regeneration of the original direct current component. Upon interruption of the signals the regenerating arrangement occupies one of two possible stable positions depending on which value the output voltage of the limiting amplifier had before the interruption. Thus when the signal reappears, the signal amplitude may not be sufficiently great to pass below the zero threshold with certainty.

Such a drawback is eliminated by means of the level regenerating arrangement according to the invention, which allows that the signal arriving after an interruption be independent of the voltage level of the regenerating signal. This regenerating arrangement comprises a detector for producing a signal, if no signals arrive during a certain time, an attenuator which is inserted in the path of the feed-back signal supplied from a low pass filter to a first summation circuit, and, in dependence on the detector signal, decreases the amplitude of the feed-back signal to allow zero passage of the incoming signal, and a second summation circuit which is connected between the first-mentioned summation circuit and a limiting amplifier and obtains its input voltage from the attenuator through a high pass filter and a change-over switch in such a way that upon restoring the attenuator by means of the detector due to the signal arriving again after an interruption, the voltage increase in the feed-back path will produce a voltage signal at the input of both the first and the second summation circuits, which voltages have an opposed sign and when added to the incoming signal give a signal that is rectified as to amplitude and polarity.

Figure 1:
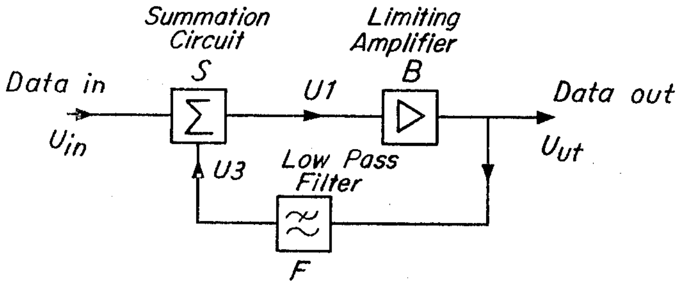
Fig. 1 PRIOR ART
Figures 2A, 2B, 2C, 2D, 2E:
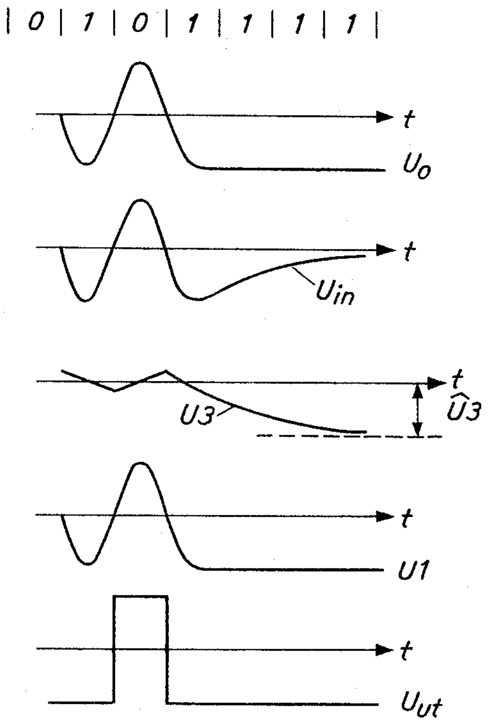
Figure 3A:
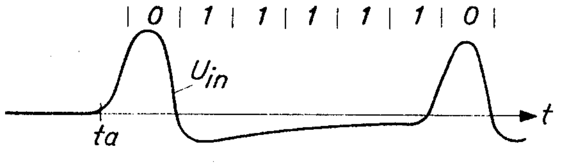
Figure 3B:
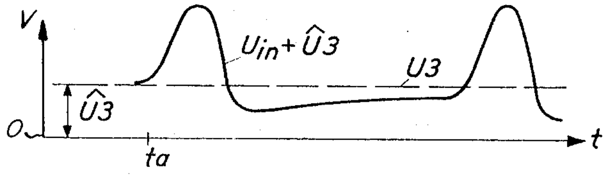
Figure 3C:
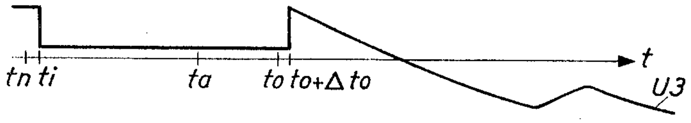
Figure 3D:
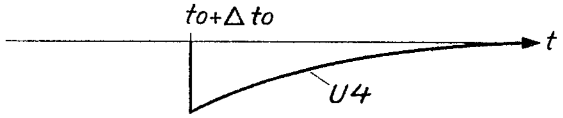
Figure 3E:
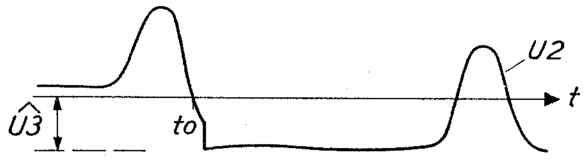
Figure 3F:
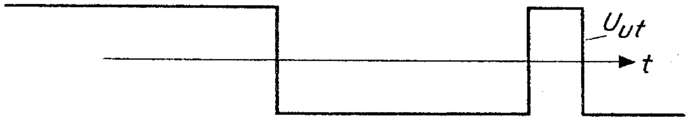
Figure 4:
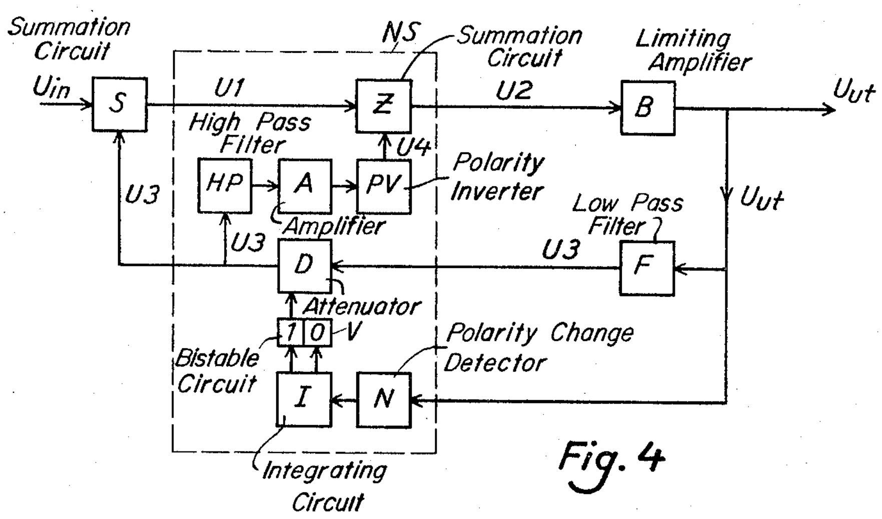
Figure 5:
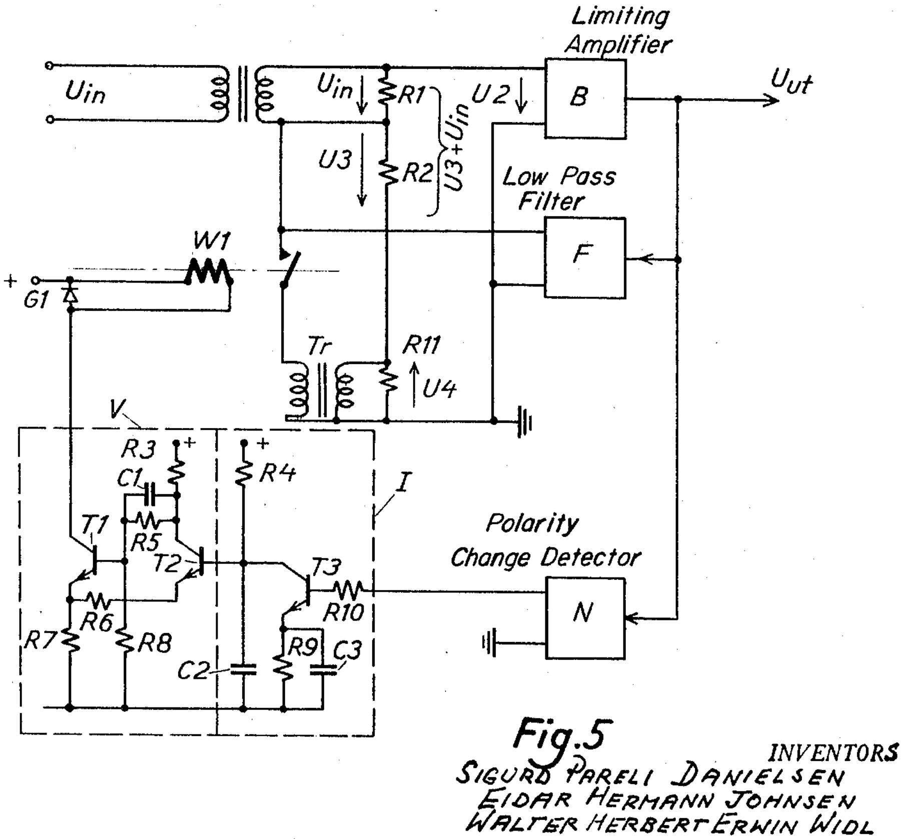

The invention will be described by means of an embodiment with reference to the enclosed drawing, in which:

FIG. 1 shows a conventional level regenerating arrangement,

FIGS. 2*a*–2*e* show the regulating process in a conventional level regenerating arrangement, FIGS. 3*a*–3*f* show the regulating process obtained by means of the level stabilizer according to the invention, FIG. 4 shows a block diagram of a level stabilizer according to the invention, and FIG. 5 shows a circuit diagram of the level stabilizer according to FIG. 4.

FIG. 1 shows in the form of a block diagram a level regenerating arrangement of the conventional type, comprising a low pass filter F, a summation circuit S and a limiting amplifier B. The incoming signal $U_{in}$ is supplied to the summation circuit S and through this to the limiting amplifier B. The output signal $U_{ut}$ of amplifier B is supplied back to the summation circuit S through the filter F. The process appears from the FIGURES 2*a*–2*e*. FIG. 2*a* shows the original signal $U_o$ which is generated on the sender side and FIG. 2*b* shows the received signal $U_{in}$ which has no direct current component. FIG. 2*c* shows the compensating voltage U3 having a maximum value $\hat{U}3$ which is obtained by the output of filter F in response to the signal received from the limiting amplifier. As a consequence of the time constant of the filter the compensating voltage will increase as a function of time, so that by a suitable dimensioning of the filter it can compensate the amplitude decrease indicated in FIG. 2*b*. FIG. 2*d* shows the output voltage $U_1$ obtained from the output of the summation circuit, which output voltage is the sum of the compensating voltage U3 obtained from the filter F and of the input signal $U_{in}$. As it appears from FIG. 2*d* the obtained signal U1 shows a good resemblance with the original signal $U_o$. FIG. 2*e* shows the voltage $U_{ut}$ obtained from the output of the limiting amplifier and supplied to the filter. From this voltage the compensating voltage according to FIG. 2*c* is obtained when it has been supplied to the filter. Upon a longer interruption, the compensating signal reaches its maximum level $\hat{U}3$ which may be positive or negative in dependence on the signal last obtained. This implies the inconvenience that if a signal arrives after the interruption, the limiter may not be affected by the signal as the latter will not pass the zero threshold. The conditions appear from FIGS. 3*a* and 3*b*, of which FIG. 3*a* shows the incoming signal and FIG. 3*b* shows this signal added to the compensating voltage U3 which has been adjusted after a longer interruption. When this sum signal is supplied to the input of the limiting amplifier, this will not be affected by the negative signals $U_{in}$ due to the fact that the sum signal all the time is moving above the 0-level as it appears from FIG. 3*b* (the time axis *t* is taken as the zero signal level).

FIG. 4 shows a block diagram of a level generating arrangement provided with a level stabilizer NS according to the invention, in order to eliminate the drawback described in connection with FIGS. 3*a* and 3*b*. As indicated in FIG. 2*a* a change of sign 1→0 and 0→1 respectively results in a change of polarity in the data signal. For each change of sign there will be generated in a conventional polarity change detector N a pulse which is fed to an integrating circuit I and discharges it. The integrating circuit I is dimensioned in such a way that it is charged after a definite time period and on its output produces a voltage which 1-sets (triggers to a first stable state, the 1-condition) a bistable circuit V if during said time period no pulses have been obtained from the polarity change detector N due to an interruption of the signal transmission. Between the low pass filter F and the summation circuit S is inserted an attenuator D. Bistable circuit V controls the attenuator such that it has a low attenuation when the bistable circuit is in 0-condition and has a high attenuation when the bistable circuit is in 1-condition. The output voltage U3 of the output of the attenuator is changed abruptly as a consequence of the change of condition. The signal U3 is supplied to the summation circuit S and to a second summation circuit Z through a high pass filter HP, an amplifier A and a polarity inverter PV. The time constant of the high pass filter HP is selected in such a way that it corresponds approximately to the time constant of the low pass filter F.

The function of the arrangement appears from FIGS. 3*c*–3*f*. FIG. 3*c* shows the time process of the output voltage U3 of the attenuator D. It is supposed that in a moment *ti* that occurs somewhat after the moment *tn* in which the time period of the charging of the integrating circuit I is ended, the bistable circuit V has been switched and the value of the signal U3 has decreased abruptly. The data signal appearing in moment *ta* brings about a change of polarity in moment *to* when the voltage $U_{in}+\hat{U}3$ (FIG. 3*b*) passes through the value Û3. Such a polarity change causes polarity change detector N to set the bistable circuit V to its zero condition which switches the attenuator D to its low attenuation condition so that the voltage U3 increases abruptly in the moment $to+\Delta to$. The voltage U3 increases in positive direction as it appears from FIG. 3*c* while the output voltage U4 from the polarity inverter PV becomes negative as indicated in FIG. 3*d*. The regenerated voltage U2 is obtained by adding the incoming voltage $U_{in}$ to the voltage U4. The voltage $U2=U_{in}+U3+U4$ as indicated in FIG. 3*e*.

By means of a suitable dimensioning of the high pass filter HP and the amplifier A it is possible to produce for the signal elements arriving after the polarity change, which according to the example are negative, an approximately constant negative voltage that is approximately equal to Û3 as indicated in FIG. 3*e*. Thus, there has been eliminated the drawback shown in FIG. 3*b* of the signal being locked above the 0-line. FIG. 3*f* shows the time process of the polarity changes on the output of the limiting amplifier B.

According to the embodiment of FIG. 4 the correction process is started when no change of sign occurs. As a criterium of interruption there may of course also be used the failing of a pilot frequency or a voice frequency data signal, the polarity detector being replaced by a pilot or signal detector respectively without changing in any way the fundamental idea of the invention.

In FIG. 5 there is shown a practical embodiment of the level stabilizer NS according to the invention, the conventional means as the limiting amplifier B, the low pass filter F and the polarity change detector N being indicated by means of blocks. The integrating circuit I consists substantially of a capacitor C2 which is connected in series with a resistance R4 and is charged through the latter. The zero setting impulse from the polarity change detector N causes activation of a transistor T3, the collector of which is connected to the connecting point of the capacitor C2 and of the resistance R4. In consequence of this the integrator is discharged and the charging starts again through the resistance R4. If, on the other hand, the capacitor C2 has been charged to such an extent that its voltage exceeds a definite value, a Schmitt-trigger V of the conventional type will be activated causing a relay W1 to operate. The primary winding of a transformer T*r* will thus be connected in parallel with the output of the low pass filter F and an attenuation arises that reduces the output voltage U3 of the filter F. The transformer T*r* performs simultaneously the function of the high pass filter HP, the voltage amplifier A and the polarity inverter PV in FIG. 4. This occurs in such a way that when the integrator I is again set to zero (capacitor C2 discharged), the relay W1 will release, whereby in the secondary winding of the transformer T*r* a voltage U4 will arise, the direction of which is opposed to the direction of the voltage U3. On the input to the limiting amplifier B is thus obtained a voltage $U2=U_{in}+U3+U4$ as is indicated in FIG. 3*e*. The relay W1 may of course be replaced by another arbitrary circuit having corresponding function.

We claim:

1. Apparatus for regenerating bipolar signals comprising: first signal summing means having first and second input terminals and an output terminal, said first input terminal being adapted to receive the bipolar signals; a second signal summing means having first and second input terminals and an output terminal; means for connecting the output terminal of said first signal summing means to the first input terminal of said second signal summing means; a limiting amplifier means having an input terminal and an output terminal for transmitting a signal from the output terminal which switches between two polarities in accordance with the polarity of the signal received at the input terminal; means for connecting the output terminal of said second signal summing means to the input terminal of said limiting amplifier means; a controlled attenuator means having an input terminal, an output terminal and a control terminal for controlling the attenuation of a signal received at the input terminal in accordance with a control signal received at the control terminal; means for connecting the output terminal of said controlled attenuator means to the second input terminal of said first signal summing means; high pass filter and signal polarity inverting means connecting the output terminal of said controlled attenuator means to the second input terminal of said second signal summing means; low pass filter means connecting the output terminal of said limiting amplifier means to the input terminal of said controlled attenuator means; and control means connecting the output terminal of said limiting amplifier means to the control terminal of said controlled attenuator means for controlling said attenuator means to change the degree of attenuation when the signal at the output terminal of said limiting amplifier means does not change polarity in a given period of time.

2. The apparatus of claim 1 wherein said control means comprises a polarity change detector having an input terminal connected to the output terminal of said limiting amplifier means and an output terminal for transmitting a pulse signal each time the signal received at the input terminal changes polarity, an integrating circuit means, having an input terminal connected to the output terminal of said polarity change detector and an output terminal, for charging to a given signal level until discharged by a pulse signal received at the input terminal, and means for connecting the output terminal of said integrating circuit means to the control terminal of said controlled attenuator.

No references cited.

ARTHUR GAUSS, *Primary Examiner.*

J. ZAZWORSKY, *Assistant Examiner.*